(12) United States Patent
Kasagi et al.

(10) Patent No.: US 8,931,758 B2
(45) Date of Patent: Jan. 13, 2015

(54) SOLENOID VALVE

(75) Inventors: Yoshinari Kasagi, Tokyo (JP); Hiroyuki Nishinosono, Tokyo (JP); Hiroyuki Iwanaga, Troy (JP)

(73) Assignee: Eagle Industry Co., Ltd., Tokyo (JP)

( * ) Notice: Subject to any disclaimer, the term of this patent is extended or adjusted under 35 U.S.C. 154(b) by 355 days.

(21) Appl. No.: 13/318,190

(22) PCT Filed: Oct. 12, 2010

(86) PCT No.: PCT/JP2010/067884
§ 371 (c)(1),
(2), (4) Date: Feb. 8, 2012

(87) PCT Pub. No.: WO2011/052371
PCT Pub. Date: May 5, 2011

(65) Prior Publication Data
US 2012/0199771 A1 Aug. 9, 2012

(30) Foreign Application Priority Data
Oct. 30, 2009 (JP) ................................. 2009-250347

(51) Int. Cl.
*F16K 31/02* (2006.01)
*F16K 31/06* (2006.01)
*F15B 13/043* (2006.01)

(52) U.S. Cl.
CPC ......... *F16K 31/0613* (2013.01); *F16K 31/0686* (2013.01)
USPC ............. 251/129.07; 251/129.15; 137/625.64

(58) Field of Classification Search
CPC .......................... F16K 31/0613; F16K 31/0686

USPC ............ 251/129.07, 129.15, 282; 137/625.64
See application file for complete search history.

(56) References Cited

U.S. PATENT DOCUMENTS

| 2004/0113112 A1* | 6/2004 | Hirata et al. .............. 251/129.15 |
| 2006/0243938 A1* | 11/2006 | Ishibashi et al. ......... 251/129.15 |
| 2008/0315140 A1* | 12/2008 | Hamaoka et al. ........ 251/129.15 |

FOREIGN PATENT DOCUMENTS

| JP | 2001187979 A | 7/2001 |
| JP | 2005188684 A | 7/2005 |

OTHER PUBLICATIONS

Murao Yoshiyuki, Kondo Jiro, Ochiai Masahiko, Denso Corp; JP2005-188684A; Jul. 14, 2005; Machine Translation of JP2005-188684A.*

* cited by examiner

*Primary Examiner* — John K Fristoe, Jr.
*Assistant Examiner* — Josephine Trinidad-Borges
(74) *Attorney, Agent, or Firm* — Harness, Dickey & Pierce, PLC

(57) ABSTRACT

Provided is a solenoid valve stable in response performance, whose quickness and damping performance are appropriate. In the solenoid valve, a respiration port for flowing fluid into and out from a space located on one side of a plunger that faces the spool is formed in an end portion of a valve sleeve. Further, a respiration groove, which causes the space on the one side of the plunger and the respiration port to communicate with each other when an end portion of the spool and an end portion of a center post are in contact with each other, is formed on the spool. This configuration makes it possible to discharge, with an appropriate level of flow-channel resistance, fluid placed in the space located on the one side of the plunger.

5 Claims, 4 Drawing Sheets

SOLENOID VALVE

TECHNICAL FIELD

The present invention relates to a solenoid valve preferable to be applied in hydraulic control for equipment such as hydraulic machinery, for example.

BACKGROUND ART

As a conventional solenoid valve for hydraulic control (e.g. Japanese Unexamined Patent Publication 2002-228036 (Patent Document 1)), for example, a spool typed three-way linear solenoid having a structure as shown in FIG. 4 is known. The solenoid valve 801 in FIG. 4 has a solenoid portion 802 as an electromotive driving portion and a valve portion 804.

The solenoid portion 802 has a solenoid case 821, a molded object 823 mounted on an inner circumference side of the solenoid case 821, and a coil 822 implanted in the molded object 823. On an inner circumference side of the molded object 823, a side ring 837, a spacer 836 and a center post 827 are fixed along an axial direction. On an inner circumference of the side ring 837, a plunger 824 is arranged in an axially movable condition and on an inner circumference of the center post 827, a rod 826 is arranged in an axially movable condition. The spacer 836 is a nonmagnetic member arranged for forming a magnetic gap. Note that the coil 822 is provided with control voltage from a connector 828 protruding out of the solenoid case 821.

The valve portion 804 has a valve sleeve 841, a spool 860, a retainer 845 and a spring 842. The valve sleeve 841 contains the spool 860 within its through-bore, and is formed with an input port in which control fluid flows, a control port which provides control fluid to a load such as automatic gearbox and the like, a drain port and a feedback port, not shown in the figure, on its peripheral wall. The spool 860 is a member arranged in the valve sleeve 841 in an axially movable condition, and is composed of a cylindrical spool shaft and a plurality of lands cylindrically formed with a larger diameter than that of the spool shaft. At a head of the spool 860, a posterior end of the spring 842 mounted in the retainer 845 is mounted, and the spool 860 is always pressed to the direction of the plunger 824 and the rod 826 by elastic force of this spring 842.

In thus-constituted solenoid valve 801, by providing electric current from a control circuit not shown in the figure to the coil 822 of the solenoid portion 802, the coil 822 generates a magnetic field with a desired strength and a desired direction. The electromagnetic force by the magnetic field allows the plunger 824 to move, the rod 826 integrally unified to the plunger 824 contacts with an end face of the spool 860 to press the spool 860 against the elastic force of the spring 842, and the spool 860 moves to the direction of the spring 842 in the valve sleeve 841.

When the amount of the electric current provided to the coil 822 is relatively increased to act large electromagnetic force to the plunger 824, the spool 860 moves toward the spring 842 in the valve sleeve 841 of the valve portion 804, and the amount of the control fluid flowing from the control port to the drain port is increased. On the other hand, when the amount of the electric current provided to the coil 822 is relatively decreased to reduce electromagnetic force acted onto the plunger 824, the spool 860 moves toward the solenoid portion 802 in the valve sleeve 841, and the amount of the control fluid flowing from the input port to the control port is increased.

PRIOR ART DOCUMENT

Patent Document

Patent Document 1: Japanese Unexamined Patent Publication No 2002-228036

DISCLOSURE OF INVENTION

Problems to be Solved by the Invention

In the solenoid valve, it is very important to obtain stable electric current-control pressure property. However, the above-mentioned conventional solenoid valve may show variations in responsiveness at the start of control, which is required to be improved.

Specifically, for example in the conventional solenoid valve 801 explained based on FIG. 4, when fluid exists in a space on a suction side of the plunger 824 (a space on a spool 860 side, oil chamber) at the start of control, and when the plunger 824 is located at an end portion on an end plate 833 side to form a void between the rod 826 and the end face of the spool 860, for transmitting thrust force to the plunger 824, the rod 826 and the spool 860 in sequence after starting the control, it is necessary to eliminate (push out) the fluid in the oil chamber on the suction side of the plunger 824 to eliminate the void between the rod 826 and the spool 860, i.e. to let the rod 826 abut against the end face of the spool 860, so that responsiveness may be delayed by time required to push out the fluid due to the thrust force of the plunger 824. This indicates that the responsiveness at the start of control is varied depending on the difference in an initial position of the plunger 824 (the length of the void between the rod 826 and the spool 860), which is not preferable.

Also, not only at the start of control but also at the normal operation, and when the spool 860 is pushed not only toward the spring 842 side but also toward its opposite side, for responsively operating a movable portion (the plunger 824, the rod 826 and the spool 860), it is necessary to smoothly transfer the fluid in the space on the end plate 833 side of the plunger 824 in and out as well as the fluid in the space on the suction side of the plunger 824.

Consequently, in some of conventional solenoid valves, the fluid present on the spool 860 side of the plunger 824 may be transferred in and out via the drain port (not shown in FIG. 4) provided near the end portion of the valve sleeve 841 on a solenoid portion 802 side. However, with the above structure, the responsiveness may not be sufficient and delay may be caused.

Also, in another case, the fluid may be flowed between the space on the spool 860 side of the plunger 824 and the space on the end plate 833 side of the same through a void of an outer circumference of the plunger 824, but in such a structure, responsiveness may not be sufficient and delay may be caused.

On the other hand, another structure has been proposed that the plunger 824 itself is provided with a breathing groove (outer circumference oil groove 851 in the example shown in FIG. 4) or a through-hole. With this structure, traffic of the fluid is smooth when the fluid is flowed in the void of the outer circumference of the plunger 824 as a flow passage, but the flowing of the fluid may be too smooth in this structure which causes a problem to reduce a dumping effect. When the responsiveness of the plunger 824 is too good, a move part including the plunger 824 may be in a self-oscillating state during the hydraulic control to cause unstable movement. A certain level of dumping performance, which depends on resistance associated with the movement (flow) of the fluid, is also required for actuation (movement) of the plunger 824.

Furthermore, for the fluid in the space at the end plate 833 of the plunger 824, as shown in FIG. 4, there may be a structure to transfer the fluid in and out via a bottom breathing hole 852 formed on the end plate 833 and an end face of the solenoid case 821. However, when the fluid is transferred in and out via the bottom breathing hole 852 and the drain port provided close to end portion of the valve sleeve 841 on a solenoid portion 802 side, contaminants around the solenoid valve 801 may enter into the solenoid valve 801.

To prevent the contaminants from entering into the solenoid valve 801, especially into the valve sleeve 841 side, i.e. to improve contamination resistance, it could be desirable to make a breathing route of the fluid around the plunger 824 as long and complicated as possible.

The present invention was made in view of the above problems, and the purpose thereof is to provide a solenoid valve having stable response performance having proper swiftness and proper dumping performance, and high contamination resistance.

Means for Solving the Problems

For attaining the above purpose, the solenoid valve of the present invention comprises a valve sleeve including a spool arranged therein in an axially movable condition; a solenoid case connected to one of axial end portions of said valve sleeve; a molded object internally mounted in said solenoid case and including a coil; a center post installed on a valve sleeve side within said molded object; a side ring installed in said molded object on the opposite side from said valve sleeve; a plunger arranged in said side ring and said center post in an axially movable condition, the plunger moving in the axial direction with magnetic force generated by said coil; a breathing hole formed in proximity to a solenoid case side end portion of said valve sleeve, for flowing in and out a fluid to a space on a spool side of said plunger; and a breathing groove formed on any one or both of said center post and said spool, the breathing groove forming a fluid passage communicating said space on the spool side of said plunger and said breathing hole when said spool is arranged closest to said plunger, and when a plunger side end portion of said spool and a spool side end portion of said center post abut on each other.

Preferably, in the solenoid valve of the present invention, the breathing hole is formed to communicate said breathing groove, communicating to the space on said spool side of said plunger, to an outside of said valve sleeve.

In the solenoid valve of the present invention having such structure, it is possible to transfer the fluid in the space on the spool side of the plunger in and out constantly with proper flow passage resistance. Therefore, it is possible to provide a solenoid valve, showing reduced variations in responsiveness at the control and having stable response performance having proper swiftness and proper dumping performance. For example, even when the fluid exists in the space on the spool side of the plunger and the plunger is located at an end portion opposite from the spool at the start of control, etc., the fluid of the space on the spool side of the plunger can be discharged with proper flow passage resistance, so that the responsiveness may not be delayed.

Also preferably, in the solenoid valve of the present invention, the breathing hole is formed to communicate said breathing groove, communicating to the space on said spool side of said plunger, to a void between an inner surface of said solenoid case and an outer surface of said molded object, the void being formed at the end portion on the valve sleeve side of said solenoid case.

Also in the solenoid valve of the present invention having the above structure, it is possible to transfer the fluid in the space on the spool side of the plunger in and out constantly with proper flow passage resistance. Therefore, it is possible to provide a solenoid valve, showing reduced variations in responsiveness at the control and having stable response performance having proper swiftness and proper dumping performance. For example, even when the fluid exists in the space on the spool side of the plunger and the plunger is located at the end portion opposite from the spool at the start of control, etc., the fluid of the space on the spool side of the plunger can be discharged with proper flow passage resistance, so that the responsiveness may not be delayed.

Also, especially in the solenoid valve of the present invention having such structure, it is possible to reduce a possibility that contaminants present around the solenoid valve enter to the space around the plunger and to improve contamination resistance because its breathing route is made as long and complicated as possible.

Also preferably, in the solenoid valve of the present invention, the molded object comprises an axial breathing route communicating to the void formed at the end portion on said valve sleeve side of said solenoid case between the inner surface of said solenoid case and the outer surface of said molded object at one of end portions thereof, and formed in the axial direction on the outer circumference surface of the molded object, and a circumferential breathing route communicating to the other end portion of said axial breathing route, and formed in the circumferential direction on the outer circumference surface of the molded object; and said solenoid case has a breathing window opening said circumferential breathing route of said molded object to the outside.

In the solenoid valve of the present invention having the above structure, it is also possible to reduce a possibility that contaminants present around the solenoid valve enter to the space around the plunger and to improve contamination resistance because its breathing route is made as long and complicated as possible.

Also in the solenoid valve having such structure, it is possible to reduce a possibility that contaminants present around the solenoid valve enter to the space on the spool side of the plunger and to improve contamination resistance because the breathing route, especially involved in the space on the spool side of the plunger, is made as long and complicated as possible.

Also preferably, in the solenoid valve of the present invention, the side ring comprises a radial groove formed on an end face of the side ring opposite from said valve sleeve, the radial groove communicating an internal space, in which said plunger of the side ring is arranged, to an outer circumference of said side ring, and an axial groove communicating to said radial groove at one of end portions thereof, the axial groove formed on an outer circumference surface of the side ring in the axial direction; said side ring further comprises a circumferential groove communicating to said side ring and the other end portion of said axial groove, the circumferential groove circumferentially formed on the outer circumference surfaces of said side ring and said molded object; and said solenoid case has a cutaway portion communicating said circumferential groove to outside.

Also in the solenoid valve of the present invention having the above structure, it is also possible to reduce a possibility that contaminants present around the solenoid valve enter to the space around the plunger and to improve contamination resistance because the breathing route is made as long and complicated as possible.

Also, according to the solenoid valve of the present invention having such structure, it is possible to reduce a possibility that contaminants present around the solenoid valve enter to a space on an opposite side from the spool of the plunger and to improve contamination resistance because the breathing route, especially involved in the space on the opposite side from the spool of the plunger, is made as long and complicated as possible.

MODE FOR CARRYING OUT THE INVENTION

First Embodiment

Figure 1:
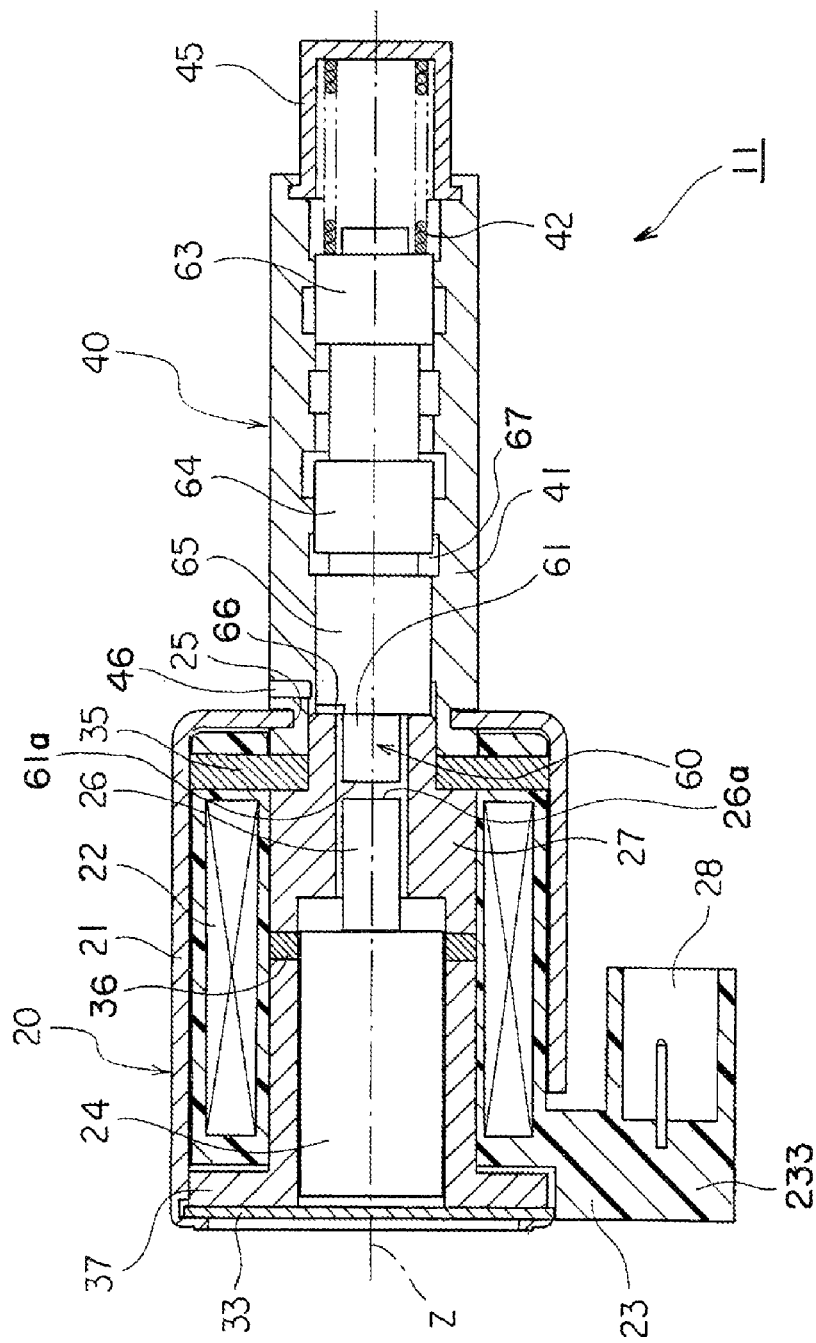
FIG. 1 is a figure showing the structure of a solenoid valve according to a first embodiment of the present invention.

The first embodiment of the present invention will be explained in reference to FIG. 1. As shown in FIG. 1, the solenoid valve 11 according to the present embodiment is a spool typed solenoid valve, and is used, for example, for controlling oil pressure of an automatic gearbox and the like of an automobile.

The solenoid valve 11 comprises a solenoid portion (linear solenoid) 20 as an electromotive driving portion, a valve body 40 and a retainer 45. The solenoid portion 20 is mounted on one of end portions (posterior end) along an axial direction Z to the valve body 40, and the retainer 45 is mounted on the other end portion (head). The solenoid portion 20 has a molded object 23 including a coil 22, a center post 27, a spacer 36, a side ring 37, a rod 26 and a plunger 24 in the solenoid case 21. One of the end portions of the valve body 40 is engaged with a case opening portion 25 of one of end portions of the solenoid case 21 to integrate the valve body 40 with the solenoid portion 20.

The coil 22 is implanted in the molded object 23 mounted to the solenoid case 21 to provide control voltage from a connector 28 installed in a connector portion 233 of the molded object 23 protruding out of the solenoid case 21. The coil 22 generates a magnetic field with a desired strength and in a desired direction depending on the control voltage to generate a driving force (magnetic attractive force) in the axial direction Z to the plunger 24. The driving force is transferred to a spool 60 via the rod 26 to move the spool 60 in the axial direction.

An annular lower plate 35 is integrally formed near an end portion of the molded object 23 on a valve body 40 side. A central opening of the lower plate 35 is engaged with the center post 27.

Also, an annular side ring 37, the spacer 36 and the center post 27, which have respectively annular shape, are installed along an axial direction on an inner circumference side of the molded object 23. The plunger 24 is arranged on an inner circumference of the side ring 37 in an axially movable condition, and the rod 26 is arranged on an inner circumference of the center post 27 in an axially movable condition. The plunger 24 and the rod 26 are integrally movable.

A head 26a (valve body 40 side end face) of the rod 26 is contacted with a posterior end 61a (solenoid portion 20 side end face) of a spool shaft 61 of the spool 60 at a normal state. Therefore, when the plunger 24 and the rod 26 move toward the valve body 40 due to the magnetic attractive force by the coil 22, the posterior end 61a of the spool shaft 61 is pressed by a head 26a of the rod 26 to move the spool 60 to a retainer 45 direction. Also, when the magnetic attractive force by the coil 22 is relatively weakened and the spool 60 is moved toward the solenoid portion 20 by elastic force of the spring 42, the head 26a of the rod 26 is pressed by the posterior end 61a of the spool shaft 61 to move the plunger 24 and the rod 26 to an end plate 33 direction.

The movement of the spool 60 to a solenoid portion 20 direction can be regulated by, for example, abutting of the after-mentioned solenoid portion 20 side end face of a third land 65 of the spool 60 on a valve body 40 side end face of the center post 27 of the solenoid portion 20 as shown in FIG. 1. In this state, when the plunger 24 and the rod 26 are further moved toward the end plate 33, a void is formed between the head 26a of the rod 26 and the posterior end 61a of the spool shaft 61. In the solenoid valve 11 of the present embodiment, as discussed below, the head 26a of the rod 26 immediately abuts against the posterior end 61a of the spool shaft 61 to start moving the spool 60 with stable responsiveness without variations at the start of control (when the plunger 24 and the rod 26 are moved again toward the valve body 40 by the magnetic attractive force of the coil 22) even when such a void is formed.

On a head of the spool 60, a posterior end of the spring 42 mounted in the retainer 45 is mounted, and the spool 60 is constantly pressed to a rod 26 direction of the plunger 24 by the elastic force of the spring 42. Note that the retainer 45 is caulked and fixed to a head of the valve sleeve 41 of the valve body 40.

A material of the valve sleeve 41 is not particularly limited, and for example, aluminum, iron, resin and the like can be exemplified. A material of the retainer 45 is not particularly limited, and for example, iron, stainless steel, resin and the like can be exemplified.

The valve sleeve 41 is formed with a drain port, a control port, an input port and a feedback port, not shown in the figure, from a head side of the sleeve 41 toward its posterior end in sequence as an opening penetrating its peripheral wall.

Also, on the peripheral wall near the solenoid portion 20 side end portion (posterior end portion) of the valve sleeve 41, a breathing hole 46 is formed, for flowing in and out a fluid from the outside of the valve body 40 to a space on a spool 60 side of the plunger 24 of the solenoid portion 20. The breathing hole 46 is communicated to the space of the spool 60 of the plunger 24 via the after-mentioned breathing groove 66 formed on the spool 60 to connect to communicate the space on the spool 60 side of the plunger 24 and the outside of the valve body 40 even when the spool 60 is moved toward the solenoid portion 20.

The input port is a port for flowing in of control fluid (e.g. operating oil) provided by a pump from a tank not shown in the figure. The control port is a port for providing the control fluid to a control fluid requesting subject (load) such as an automatic gearbox not shown in the figure. The feedback port and the control port are communicated on the outside of the solenoid valve 11, and a part of the control fluid flowing out of the control port flows in the feedback port.

The spool 60 is arranged in a movable condition at an approximate center of the valve sleeve 41 along the axial direction Z, and is composed of the spool shaft 61 and a first to a third lands 63 to 65 which are cylindrically formed.

The first to the third lands 63 to 65 are integrally formed with a predetermined interval on the spool shaft 61 from the spring 42 side end portion of the spool 60 along the axial direction Z in sequence.

Outer diameters of the first to the third lands 63 to 65 are larger than an outer diameter of the spool shaft 61. Also, the outer diameters of the first land 63 and the second land 64 are approximately same, and the outer diameter of the third land 65 is smaller than the outer diameters of the first land 63 and the second land 64.

A solenoid portion 20 side end face of the third land 65 is formed with the breathing groove 66 for flowing in and out a fluid from the outside of the valve body 40 to the space on the spool 60 side of the plunger 24 of the solenoid portion 20. The solenoid portion 20 side end face of the third land 65 of the spool 60 is formed to regulate the movement of the spool 60 to the solenoid portion 20 direction by moving the spool 60 toward the solenoid portion 20 in the valve sleeve 41 to abut against the valve body 40 side end face of the center post 27. In this state, namely, when the spool 60 is moved closest to the solenoid portion 20 and when the solenoid portion 20 side end face of the third land 65 and the valve body 40 side end face of the center post 27 abut against each other, the breathing groove 66 formed on the solenoid portion 20 side end face of the third land 65 allows connecting the space on the spool 60 side of the plunger 24 of the solenoid portion 20 with the breathing hole 46 formed on the peripheral wall near the solenoid portion 20 side end portion (posterior end portion) of the valve sleeve 41.

By providing the breathing groove 66, when the plunger 24 and the rod 26 are moved to the valve body 40 direction, the fluid in the space on the spool 60 side of the plunger 24 can be immediately discharged to the outside, so that the responsiveness of the solenoid valve 11 can be made faster. Also, when the plunger 24 and the rod 26 are moved to a direction away from the valve body 40, the fluid can be made immediately flow in from the outside to the space on the spool 60 side of the plunger 24, and in this case, it is also possible to make the responsiveness of the solenoid valve 11 faster.

Particularly when the control is started and when the plunger 24 is located on an end plate 33 side end portion to form the void between the head 26a of the rod 26 and the posterior end 61a of the spool shaft 61, it is possible to quickly eliminate (push out) a fluid in an oil chamber on the suction side of the plunger 24 to cancel the void between the rod 26 and the spool 60, i.e. to make the rod 26 abut against an end face of the spool 60, so that even at the start of control when the variations in the responsiveness are conventionally caused, the control can be done with proper response performance without variations.

Also, on the other hand, a fluid flow passage formed by the breathing groove 66 and the breathing hole 46 of the valve sleeve 41 as mentioned above are formed to have a somewhat small cross-sectional area. As a result, fluid resistance when the fluid flows in and out may exhibit a dumping function related to the movement of the plunger 24 to improve the response performance of the solenoid valve 11. The cross-sectional area of the fluid flow passage formed by the breathing groove 66 and the breathing hole 46 of the valve sleeve 41 is specifically preferably about 0.2 to 2.1 mm$^2$, for example.

Within the valve sleeve 41, a feedback chamber 67 is formed between the second land 64 and the third land 65. Since there is a difference between the outer diameters of the second land 64 and the third land 65, areas where the control fluid fed back to the feedback chamber 67 works on the spool 60 are different. Therefore, by taking a balance among three forces, i.e. feedback force generated due to the difference in area (difference in outer diameters of the land 64 and the land 65), spring force due to the spring 42 and electromagnetic force varied depending on magnitude of electric current, a desired output pressure can be obtained for the control fluid flowing out of the control port. For example, in the case of a control valve in which the output pressure is decreased with increase in the electric current provided to the solenoid portion 20, the balance of the above three forces can be expressed by the following formula (1).

$$[\text{spring force}] = [\text{output pressure}] + [\text{electromagnetic force}] \qquad (1).$$

Wherein output pressure is feedback force generated by difference in outer diameters of lands.

Also, in the case of a control valve in which the output pressure is increased with decrease in the electric current provided to the solenoid portion 20, the balance of the above three forces can be expressed by the following formula (2).

$$[\text{spring force}] + [\text{output pressure}] = [\text{electromagnetic force}] \qquad (2).$$

Wherein output pressure is feedback force generated by difference in outer diameters of lands.

The spool 60 abuts against the spring 42 on its one end along the axial direction Z under normal control state, and abuts against the rod 24 on the other end along the axial direction Z. Therefore, the suppress strength (spring force) of the spring 42 and the suppress strength (electromagnetic force) by the movement of the plunger 24 via the rod 24 are transferred to the spool 60 in addition to the suppress strength (feedback force) of the control fluid in the feedback chamber 67. These suppress strengths allow the spool 60 to slide in the axial direction Z within the valve sleeve 41.

In the solenoid valve 11 having such structure, the spool 60 comes to rest at a position where the suppress strength (spring force) of the spring 42, the force (electromagnetic force) pressing the spool 60 by the plunger 24 with magnetic attractive force of the magnetic field generated by the electric current provided to the coil 22 and suppress strength (feedback force) received by the spool 60 due to the pressure of the control fluid in the feedback chamber 67 are balanced. Specifically, it is statically balanced at the above balanced position, and actually, this is controlled by frequently opening and closing the input port and the drain port.

The position of the spool 60 within the valve sleeve 41 is controlled by the above forces, and the input port and/or the drain port are opened and closed in a desired state.

Also, an amount of the control fluid flowing from the input port to an output port is determined by an opening degree of the input port. The opening degree of the input port is determined by the position of the spool 60 in the valve sleeve 41.

In thus-constituted solenoid valve 11, by providing the electric current to the coil 22 of the solenoid portion 20 from a control circuit not shown in the figure, the coil 22 generates magnetic field with a desired strength in a desired direction, and due to the electromagnetic force by this magnetic field, the plunger 24 moves and the spool 60 moves in the valve sleeve 41 of the valve body 40.

Therefore, when an amount of the electric current provided to the coil 22 is increased to act large electromagnetic force onto the plunger 24, the spool 60 moves toward the spring 42 in the valve sleeve 41 of the valve body 40. When the spool 60 moves toward the spring 42 in the valve sleeve 41, the amount of the control fluid flowing from the control port to the drain port is increased.

On the other hand, when the amount of the electric current provided to the coil 22 is made relatively small to decrease the electromagnetic force acted onto the plunger 24, the spool 60 moves toward the solenoid portion 20 in the valve sleeve 41. When the spool 60 moves toward the solenoid portion 20 in the valve sleeve 41, the amount of the control fluid flowing from the input port to the control port is increased.

As explained above, in the solenoid valve 11 of the present embodiment, the solenoid portion 20 side end face of the third land 65 of the spool 60 is provided with the breathing groove 66, and the peripheral wall of the valve sleeve 41 is provided with the breathing hole 46 communicated to the breathing groove 66 to make the cross-sectional area of the fluid flow passage formed by these into a proper cross-sectional area, so that it is possible to obtain stable response performance having proper swiftness and proper dumping performance.

Second Embodiment

Figure 2:
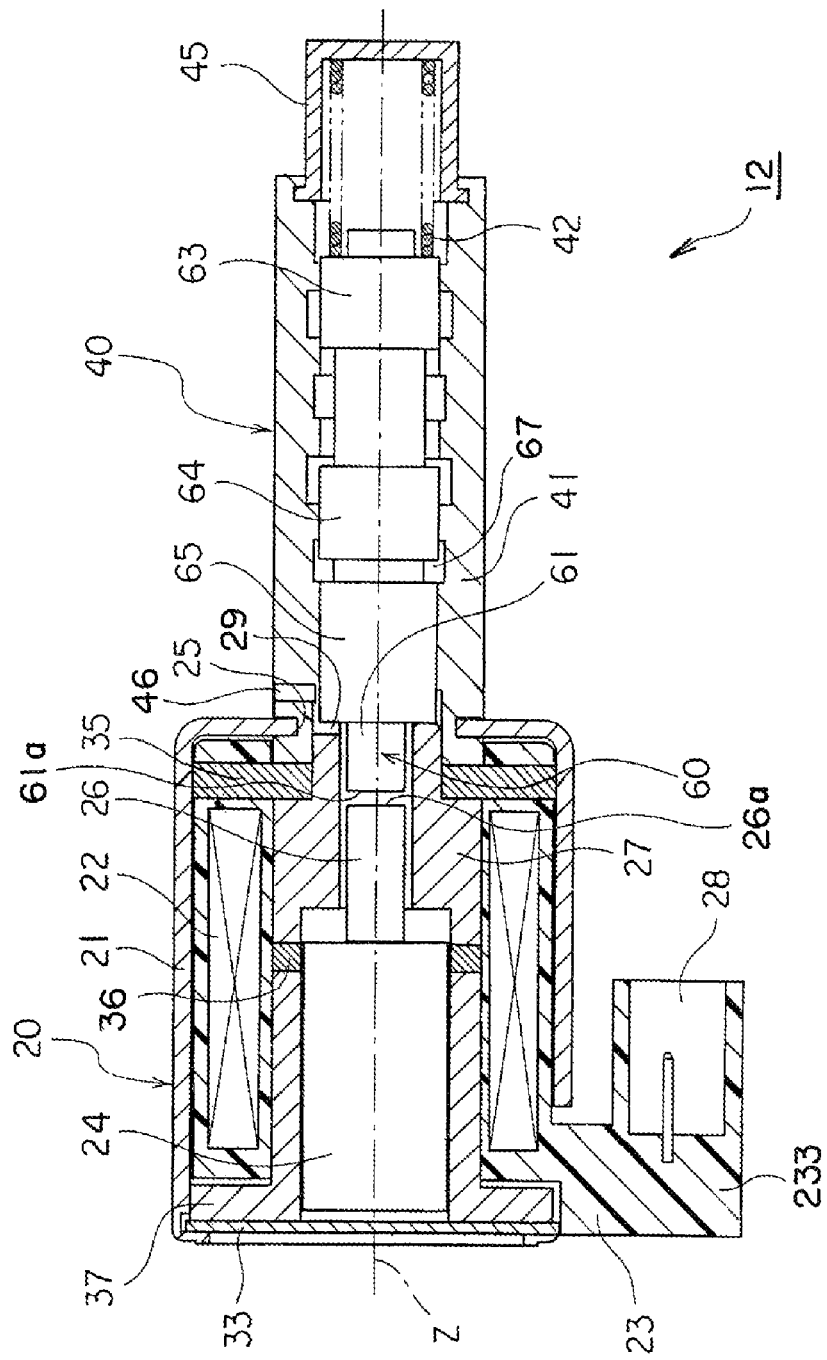
FIG. 2 is a figure showing the structure of a solenoid valve according to a second embodiment of the present invention.

The second embodiment of the present invention will be explained in reference to FIG. 2. The solenoid valve 12 according to the present embodiment is also a spool typed solenoid valve as with the solenoid valve 11 of the first embodiment, and for example, is used for controlling oil pressure of an automatic gearbox and the like of an automobile.

In the solenoid valve 11 of the first embodiment, the third land 65 to be the solenoid portion 20 side end face of the spool 60 is formed with the breathing groove 66, so that the fluid flow passage is formed for connecting the space at the spool 60 side of the plunger 24 and the breathing hole 46 formed on the valve sleeve 41 when the spool 60 is arranged closest to the solenoid portion 20.

On the other hand, in the solenoid valve 12 of the present embodiment, by forming a breathing groove 29 on the spool 60 side end face of the center post 27 abutting against the solenoid portion 20 side end face of the third land 65 when the spool 60 is arranged closest to the solenoid portion 20, a fluid flow passage is formed for connecting the space on the spool 60 side of the plunger 24 and the breathing hole 46 formed on the valve sleeve 41.

In thus-constituted solenoid valve 12, the valve body 40 side end face of the center post 27 of the solenoid portion 20 is provided with the breathing groove 29, and the peripheral wall of the valve sleeve 41 is provided with the breathing hole 46 communicated to the breathing groove 66, to make the cross-sectional area of the fluid flow passage formed by these into a proper cross-sectional area, so that it is possible to obtain stable response performance having proper swiftness and proper dumping performance as in the solenoid valve 11 of the first embodiment.

Note that in the solenoid valve 12 of the second embodiment, except for forming the breathing groove 29 on the center post 27 without forming the breathing groove 66 formed on the third land 65 in the solenoid valve 11 as in the first embodiment, the other constitutions are substantially same as the corresponding constitutions of the solenoid valve 11 of the first embodiment where the same symbols are given.

Third Embodiment

The third embodiment of the present invention will be explained in reference to FIG. 3A to 3C. The solenoid valve 13 of the third embodiment is a spool typed solenoid valve as with the solenoid valve 11 of the first embodiment and the solenoid valve 12 of the second embodiment, and is used for controlling oil pressure of an automatic gearbox and the like of an automobile.

The solenoid valve 11 of the first embodiment and the solenoid valve 12 of the second embodiment are designed to allow the fluid to flow in and out with proper flow passage resistance with respect to the space on the spool 60 side of the plunger 24 (so as to have proper response performance). In the spool typed solenoid valve, it is also desirable that the fluid properly flows in to the space formed on the opposite side of the plunger 24 (end plate 33 side space) when the plunger 24 moves toward the valve body 40 (when the plunger 24 moves in a direction away from the end plate 33) and that the fluid is properly discharged when the plunger 24 moves toward the end plate 33. The solenoid valve 13 of the present embodiment is designed to make the fluid to properly flow in and out with respect to both spool 60 side and its opposite side (end plate 33 side) of the plunger 24.

Figure 3A:
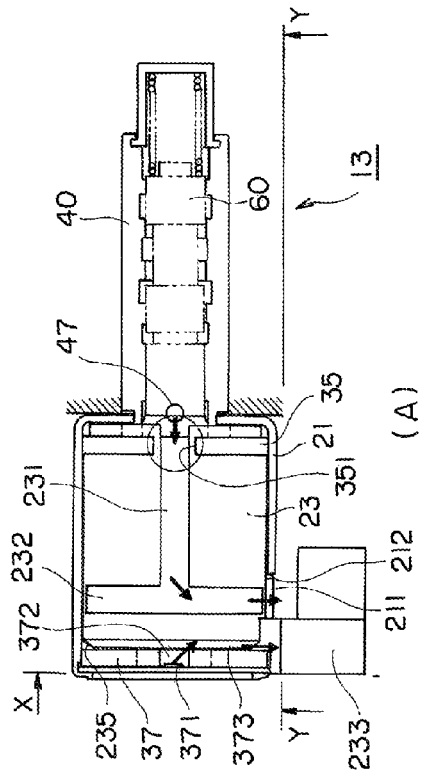
FIG. 3A is a figure showing the structure of a solenoid valve according to a third embodiment of the present invention as well as FIG. 3B and FIG. 3C, for explaining the structure of an outer circumference surface of a molded object.
Figure 3B:
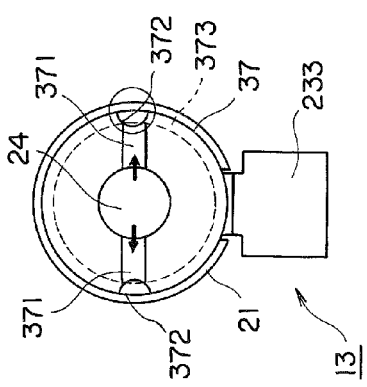
FIG. 3B is a figure showing the structure of the solenoid valve according to the third embodiment of the present invention as well as FIG. 3A and FIG. 3C, and is a view of the solenoid valve from X-X direction in FIG. 3A for explaining the structure of an end face of a side ring.
Figure 3C:
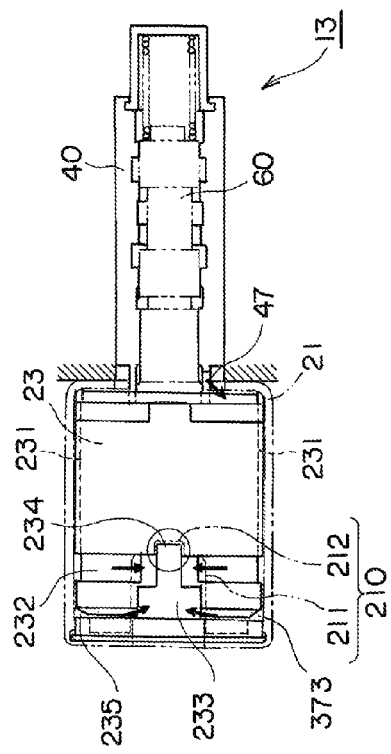
FIG. 3C is a figure showing the structure of the solenoid valve according to the third embodiment of the present invention as well as FIG. 3A and FIG. 3B, and is a view of the solenoid valve from Y-Y direction in FIG. 3A for explaining the structure of a connector portion and a solenoid case of the molded object.
Figure 4:
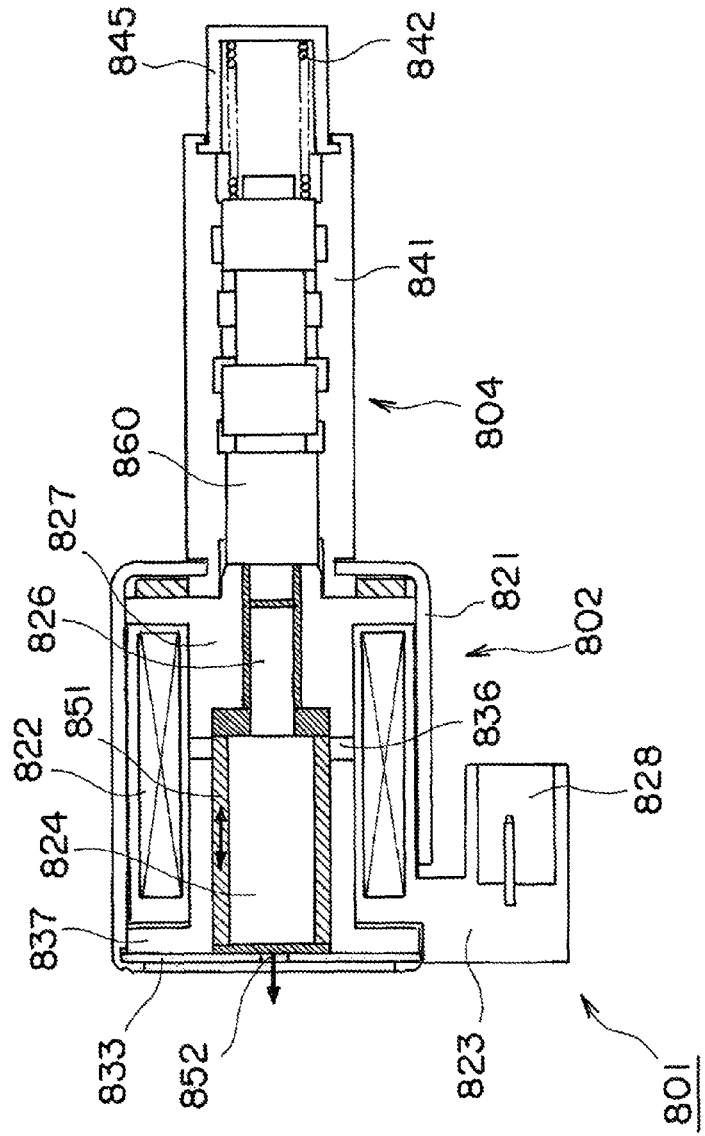
FIG. 4 is a figure showing the structure of a conventional solenoid valve.

FIG. 3A to 3C are figures showing the structure of the solenoid valve 13 of the third embodiment, FIG. 3A is a figure for explaining the structure of the outer circumference surface of the molded object 23, FIG. 3B is a view of the solenoid valve 13 from X-X direction in FIG. 3A for explaining the structure of the end face of the side ring 37, and FIG. 3C is a view of the solenoid valve 13 from Y-Y direction in FIG. 3A for explaining the structures of a connector portion 233 and a solenoid case 21 of the molded object 23.

Note that details will be left out in the following explanation for substantially same constitutions as in the solenoid valves 11 and 12 of the first embodiment and second embodiment, where the same symbols are given.

The solenoid valve 13 is formed with a breathing hole 47 communicated to the space on the spool 60 side of the plunger 24 on the solenoid portion 20 side end portion of the valve sleeve 41 as with each breathing hole 46 (see FIG. 1 and FIG. 2) of the solenoid valve 11 of the first embodiment and the solenoid valve 12 of the second embodiment. Communication between the space at the spool 60 side of the plunger 24 and the breathing hole 47 when the spool 60 is arranged closest to the solenoid portion 20 is attained via the breathing groove 66 formed on the third land 65 as in the solenoid valve 11 of the above-mentioned first embodiment, or via the breathing groove 29 formed on the center post 27 as in the solenoid valve 12 of the above-mentioned second embodiment.

The breathing hole 47 formed on the valve sleeve 41 in the solenoid valve 13 is, as shown in FIG. 3C, formed to let the fluid to flow in and out with respect to void between an inner circumference of the solenoid case 21 and an outer circumference of the molded object 23, unlike the breathing hole 46 of the solenoid valve 11 or 12 of the first or second embodiment which is formed to let the fluid to flow in and out with respect to outside (circumference of the valve body 40).

In the solenoid valve 13, the outer circumference portion of the molded object 23 is formed with a groove (axial breathing route) 231 as a fluid flow passage (breathing route) along an axial direction. Two axial breathing routes 231 are formed on the outer circumference of the molded object 23 in the present embodiment at opposing positions having a central angle deviated by 180° from each other.

Also, the lower plate 35 installed on the valve body 40 side of the molded object 23 is formed with a cutaway portion 351 communicated to the axial breathing route 231 of the molded object 23. Namely, the axial breathing route 231 is formed as a groove penetrating through a construct formed by integrating the lower plate 35 and the molded object 23.

A valve body 40 side end portion of the axial breathing route 231 is communicated to void between a bottom face on the valve body 40 side of the molded object 23 and an inner bottom face of the solenoid case 21. In the solenoid valve 13, the valve sleeve 41, the solenoid case 21 and the molded object 23 are installed to have relative positions in circumferential direction satisfying a specific position relation by engaging an engaging portion (e.g. engaging convex portion and engaging concave portion) not shown in the figure properly formed on the respective members. The breathing hole 47 formed on the valve sleeve 41, the void formed between the bottom face of the molded object 23 and the bottom face of the solenoid case 21, and the axial breathing route 231 formed on the molded object 23 are communicated in series in the state, and formed a flow passage (breathing route) of the fluid.

An outer circumference on the end plate 33 side end portion side of the molded object 23 is formed with a groove (circumferential breathing route) 232 formed to orbit on an outer circumference of the molded object 23 along circumferential direction as a fluid flow passage (breathing route) as well. An axial position of the circumferential breathing route 232 is determined to arrange the circumferential breathing route 232 at a position of a cutaway portion 210 of the solenoid case 21 where the connector portion 233 of the molded object 23 is engaged when the molded object 23 is mounted on the solenoid case 21. The cutaway portion 210 of the solenoid case 21 is not blocked in the state that the connector portion 233 is engaged, and has a breathing window 211 opening to the outside, and the circumferential breathing route 232 is opened to the outside via the breathing window 211 to let the fluid flow in and out.

The above-mentioned axial breathing route 231 of the molded object 23 is formed to communicate the end plate 33 side end portion to the circumferential breathing route 232.

The solenoid case 21 shown as dashed-two dotted line in FIG. 3C has the cutaway portion 210 where the connector portion 233 of the molded object 23 is engaged, as mentioned above. The cutaway portion 210 is an unblocked region even in the state that the connector portion 233 is engaged, and has the breathing window 211 communicated to the circumferential breathing route 232 of the molded object 23 and an engaging portion 212 engaged with a projection portion 234 of the connector portion 233 for securing to have the breathing window 211 and for securing the broadly-opened breathing window 211 to let the fluid smoothly flow in and out.

The end plate 33 side end face of the side ring 37 is formed with a radial groove 371 for communicating the central opening and outer circumference of the side ring 37. Also, an outer circumference portion of the side ring 37 is formed with an axial groove 372 along an axial direction. Two axial grooves 372 are formed on the outer circumference of the side ring 37 at opposing positions having a central angle deviated by 180° in the present embodiment, and two radial grooves 371 are formed to respectively connect these two axial grooves 372 with the central opening. Also, the radial groove 371 and axial groove 372 are respectively formed at positions having a central angle deviated by 90° with respect to the connector portion 233 of the molded object 23.

Also, a corner portion of an outer circumference of the end plate 33 side end face of the molded object 23 is chamfered to form a chamfered portion 235, and a fluid flow passage (breathing route) 373 is formed to orbit on an outer circumference between the side ring 37 and the molded object 23. The circumferential breathing route 373 is communicated to the axial groove 372 of the side ring 37, and is also communicated to the cutaway portion 210 of the solenoid case 21.

As a result, a space in the central opening of the side ring 37, which is the space on the end plate 33 side of the plunger 24, is communicated to an exterior of the solenoid valve 13 via the radial groove 371 and axial groove 372 formed on the side ring 37, the circumferential breathing route 373 formed on the outer circumference portion between the side ring 37 and the molded object 23 and the cutaway portion 210 of the solenoid case 21.

In the solenoid valve 13 having such a structure, the breathing route is formed with respect to both of the space on the spool 60 side of the plunger 24 and the space on the end plate 33 side of the plunger 24 for transferring in and out the fluid. Therefore, by making the cross-sectional area of each of the breathing routes a proper cross-sectional area, it is possible to obtain the solenoid valve 13 having stable response performance having proper swiftness and proper dumping performance.

Also, in the solenoid valve 13 of the present embodiment, the fluid is transferred in and out to the outside in the cutaway portion 210 formed on the connector portion 233, and it is unnecessary to provide other breathing windows on the solenoid portion.

Also, two axial breathing routes 231 formed on the outer circumference of the molded object 23 are formed to have a central angle deviated by 90° respectively with respect to the cutaway portion 210 of the solenoid case 21, installed and connected to the cutaway portion 210 via circumferential breathing route 232, and the breathing route from the space on the spool 60 side of the plunger 24 to the cutaway portion 210 of the connector portion 233 is secured to be as long and complicated as possible. Also, the radial groove 371 and axial groove 372 formed on the side ring 37 are formed to have a central angle deviated by 90° respectively with respect to the cutaway portion 210 of the solenoid case 21, installed and connected to the cutaway portion 210 via the circumferential breathing route 373 between the side ring 37 and the molded object 23, and the breathing route from the space on the end plate 33 side of the plunger 24 to the cutaway portion 210 of the connector portion 233 is secured to be as long and complicated as possible. As a result, it is possible to reduce the possibility that contaminants around the circumference of the solenoid valve 13 enter to the space on the spool 60 side of the plunger 24, and the space on the end plate 33 side of the plunger 24, so that contamination resistance can be improved.

Other Embodiments

Note that the present invention is not limited to the above-mentioned embodiments, and can be variously modified within the scope of the present invention.

For example, by forming the breathing groove 66 on the third land 65 in the solenoid valve 11 of the above-mentioned first embodiment and forming the breathing groove 29 on the center post 27 in the solenoid valve 12 of the above-mentioned second embodiment, the fluid passages are respectively formed with the desired cross-sectional area for connecting the space on the spool 60 side of the plunger 24 and the breathing hole 46 of the valve sleeve 41. On the other hand, by respectively forming the breathing groove 66 and the breathing groove 29 on the surfaces facing against the third land 65 and the center post 27 and joining these two breathing groove 66 and the breathing groove 29, a fluid passage may be formed with a desired cross-sectional area for connecting the space on the spool 60 side of the plunger 24 and the breathing hole 46 of the valve sleeve 41.

INDUSTRIAL APPLICABILITY

The solenoid valve according to the present invention can be used in any apparatus for controlling flow amount and pressure of a fluid, such as hydraulic control of an automatic gearbox of an automobile.

The invention claimed is:

1. A solenoid valve comprising:
a valve sleeve including a spool arranged therein in a movable condition in the axial direction;
a solenoid case connected to one end portion in the axial direction of said valve sleeve;
a molded object mounted inside of said solenoid case and including a coil;
a center post provided on the valve sleeve side of the inside of said molded object;
a side ring provided on the opposite side from said valve sleeve of the inside of said molded object;
a plunger arranged in said side ring and said center post in a movable condition in the axial direction, said plunger being moved in the axial direction by magnetic force generated by said coil;
a breathing hole formed in proximity to an end portion of the solenoid case side on said valve sleeve, the breathing hole allowing a fluid to flow into and from a space on the spool side of said plunger, and
a breathing groove formed on any one or both of said center post and said spool, and forming a fluid passage communicating with said space on the spool side of said plunger and said breathing hole when said spool is arranged closest to said plunger and a plunger side end portion of said spool and a spool side end portion of said center post come in contact with each other; wherein
said breathing hole is formed to communicate with said breathing groove communicating with the space on said spool side of said plunger to a void formed at an end portion on the valve sleeve side of said solenoid case between an inner surface of said solenoid case and an outer surface of said molded object.

2. The solenoid valve as set forth in claim 1, wherein the molded object comprises an axial breathing route and an circumferential breathing route, said axial breathing route communicating at one end portion thereof to the void formed at the end portion on said valve sleeve side of said solenoid case between the inner surface of said solenoid case and the outer surface of said molded object, said axial breathing route being formed on an outer circumference surface of the molded object in the axial direction, and said circumferential breathing route communicating to the other end portion of said axial breathing route, and said circumferential breathing route being formed on the outer circumference surface of the molded object; and
said solenoid case comprises a breathing window opening said circumferential breathing route of said molded object to the outside.

3. The solenoid valve as set forth in claim 1, wherein said side ring comprises a radial groove formed on an end face of said side ring opposite from said valve sleeve and an axial groove formed on an outer circumference surface of said side ring in the axial direction, said radial groove communicating an internal space of said side ring in which said plunger is arranged to an outer circumference of said side ring, and said axial groove communicating to said radial groove at one end portion thereof,
said solenoid valve further comprises a circumferential groove communicating to said side ring and the other end portion of said axial groove, said circumferential groove formed on the outer circumference surfaces of said side ring and said molded object; and
said solenoid case has a cutaway portion communicating said circumferential groove to the outside.

4. A solenoid valve comprising:
a valve sleeve including a spool arranged therein and movable in an axial direction;
a solenoid case connected to an axial end portion of said valve sleeve;
a molded object mounted inside of said solenoid case and including a coil;
a center post provided on the valve sleeve side of the inside of said molded object;
a side ring provided on an opposite side of said valve sleeve at an inside of said molded object;
a plunger arranged in said side ring and said center post, said plunger movable in the axial direction by a magnetic force generated by said coil;
a breathing hole formed in said valve sleeve proximit to an end portion of the solenoid case, the breathing hole allowing a fluid to flow into and from a space on a spool-side of said plunger; and
a breathing groove formed on any one or both of said center post and said spool, and forming a fluid passage communicating with said space and said breathing hole when said spool is arranged closest to said plunger and when a plunger-side end portion of said spool and a spool-side end portion of said center post come in contact with each other,
wherein said breathing hole is formed to communicate with said breathing groove and with a void formed at an end portion on the valve sleeve side of said solenoid case between an inner surface of said solenoid case and an outer surface of said molded object, and
wherein the molded object comprises an axial breathing route and an circumferential breathing route, said axial breathing route communicating at one end portion thereof with the void, said axial breathing route being formed on an outer circumference surface of the molded object in the axial direction, and said circumferential breathing route communicating with a second end portion of said axial breathing route, and said circumferential breathing route being formed on the outer circumference surface of the molded object; and
wherein said solenoid case comprises a breathing window opening said circumferential breathing route of said molded object to the outside.

5. The solenoid valve as set forth in claim 4, wherein said side ring comprises a radial groove formed on an end face of said side ring opposite from said valve sleeve and an axial groove formed on an outer circumference surface of said side ring in the axial direction, said radial groove communicating an internal space of said side ring in which said plunger is arranged to an outer circumference of said side ring, and said axial groove communicating to said radial groove at one end portion thereof,
said solenoid valve further comprises a circumferential groove communicating to said side ring and the other end portion of said axial groove, said circumferential groove formed on the outer circumference surfaces of said side ring and said molded object; and said solenoid case has a cutaway portion communicating said circumferential groove to the outside.

* * * * *